US009613111B2

(12) United States Patent
Gibbons

(10) Patent No.: US 9,613,111 B2
(45) Date of Patent: Apr. 4, 2017

(54) MAPPING DATA INTO AN AUTHORIZED DATA SOURCE

(71) Applicant: BANK OF AMERICA CORPORATION, Charlotte, NC (US)

(72) Inventor: Brian P. Gibbons, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 115 days.

(21) Appl. No.: 14/577,467

(22) Filed: Dec. 19, 2014

(65) Prior Publication Data

US 2016/0179905 A1 Jun. 23, 2016

(51) Int. Cl.
*G06F 17/30* (2006.01)
*G06F 21/62* (2013.01)

(52) U.S. Cl.
CPC .... *G06F 17/30557* (2013.01); *G06F 21/6218* (2013.01); *G06F 2221/2111* (2013.01)

(58) Field of Classification Search
CPC .......... H04L 63/10; H04L 63/08; G06F 17/30
See application file for complete search history.

(56) References Cited

U.S. PATENT DOCUMENTS 7,117,219 B1 * 10/2006 Powers ............. G06F 17/30572
705/35
2008/0235041 A1 * 9/2008 Cashdollar ............. G06Q 10/10
705/1.1

\* cited by examiner

*Primary Examiner* — Jeffrey Pwu
*Assistant Examiner* — Wasika Nipa
(74) *Attorney, Agent, or Firm* — Michael A. Springs; Moore & Van Allen PLLC; Anup Shrinivasan

(57) ABSTRACT

Embodiments of the invention are directed to systems, methods, and computer program products for mapping data to an authorized data source. The system is configured to receive data from one or more systems of record, wherein the data comprises one or more fields; determine one or more domains associated with the data, wherein the one or more domains comprise at least a transaction domain, a reference and master data domain, a derived domain, and a discovery domain; determine one or more data types associated with each of the one or more domains; categorize the data into at least one of the one or more domains and the one or more data types, wherein categorizing the data further comprises reconciling the data and removing data redundancies; and store the categorized data as an authorized data source capable of being accessed by one or more target systems.

12 Claims, 8 Drawing Sheets

| DOMAIN | DATA TYPE | AUTHORIZED DATA SOURCE | TECHNICAL CONTACT | BUSINESS CONTACT |
|---|---|---|---|---|
| TRANSACTION DATA | ○ TRANSACTION DATA TYPE 1 | TXN ADS 1 | TECH CONTACT 1 | BUSINESS CONTACT 1 |
| | ○ TRANSACTION DATA TYPE 2 | TXN ADS 2 | TECH CONTACT 2 | BUSINESS CONTACT 2 |
| | ○ TRANSACTION DATA TYPE N | TXN ADS N | TECH CONTACT N | BUSINESS CONTACT N |
| REFERENCE AND MASTER DATA | ○ REFERENCE AND MASTER DATA TYPE 1 | R&M ADS 1 | TECH CONTACT 3 | BUSINESS CONTACT 3 |
| | ○ REFERENCE AND MASTER TRANSACTION DATA TYPE 2 | R&M ADS 2 | TECH CONTACT 4 | BUSINESS CONTACT 4 |
| | ○ REFERENCE AND MASTER DATA TYPE N | R&M ADS N | TECH CONTACT N | BUSINESS CONTACT N |
| DERIVED DATA | ○ DERIVED DATA TYPE 1 | DERIVED ADS 1 | TECH CONTACT 5 | BUSINESS CONTACT 5 |
| | ○ DERIVED DATA TYPE 2 | DERIVED ADS 2 | TECH CONTACT 6 | BUSINESS CONTACT 6 |
| | ○ DERIVED DATA TYPE N | DERIVED ADS N | TECH CONTACT N | BUSINESS CONTACT N |

FIGURE 7

MAPPING DATA INTO AN AUTHORIZED DATA SOURCE

FIELD

In general, embodiments of the invention relate to enterprise data management, in particular, embodiments of the invention relate to a framework to enable an organization to precisely define, easily integrate, and effectively retrieve data for both internal and external communication.

BACKGROUND

Enterprise data management (EDM) focuses on the creation of accurate, consistent, and transparent content. Typically, EDM emphasizes data precision, granularity, and meaning, and is concerned with how the content is integrated into business applications as well as how it is passed along from one business process to another. Organizational functions such as compliance management, risk management, operating efficiencies, effective client relationships, and marketing rely on the accuracy of data for effective decision making. Multiple business groups such as risk, operations, trading, compliance, or the like, within an organization, view the same information differently. This can lead to challenges in ensuring data quality, definitions, information storage, and control.

There is a need for a framework and establish guiding principles for efficient data management.

BRIEF SUMMARY

Embodiments of the present invention address the above needs and/or achieve other advantages by providing apparatuses (e.g., a system, computer program product, and/or other device) and methods for an enterprise data management framework. The present invention includes a set of guiding principles by developing taxonomy of data domains and establishing authorized data sources for each domain through an enterprise data source inventory and selection process. In this regard, the present invention includes defining data management and developing a standardized approach to map one or more systems of record to the data domains and the authorized data sources. In addition, the present invention includes transforming data in the authorized data sources to be presented to one or more target systems based on a set of requirements associated with each target system.

In one aspect, a system for mapping data into an authorized data source is presented. The system comprising at least non-transitory storage device; at least one processor; and at least one module stored in said storage device and comprising instruction code that is executable by the at least one processor and configured to cause said at least one processor to: receive data from one or more systems of record, wherein the data comprises one or more fields; determine one or more domains associated with the data, wherein the one or more domains comprise at least a transaction domain, a reference and master data domain, a derived domain, and a discovery domain; determine one or more data types associated with each of the one or more domains; categorize the data into at least one of the one or more domains and the one or more data types, wherein categorizing the data further comprises reconciling the data and removing data redundancies; and store the categorized data as an authorized data source capable of being accessed by one or more target systems.

In some embodiments, the instruction code of said module for causing the at least one processor to determine whether the data received from one or more systems of record comprise data duplicates; compare the one or more fields associated with the data with one or more fields associated with the data duplicates; match at least a portion of the one or more fields associated with the data with the one or more fields associated with the data duplicates; and determine one or more actions to be executed, wherein the one or more actions comprise at least filtering for unique values and removing duplicate values associated with the matched portion of the one or more fields.

In some embodiments, the instruction code of said module for causing the at least one processor to: compare the one or more fields associated with the data with one or more fields associated with the data categorized under the same domain and/or domain type; determine that at least a portion of the one or more fields associated with the data does not match the one or more fields associated with the data categorized under the same domain and/or domain type; and determine that the data requires reconciliation based on at least determining that at least a portion of the one or more fields associated with the data does not match the one or more fields associated with the data categorized under the same domain and/or domain type.

In some embodiments, the instruction code of said module for causing the at least one processor to: categorize the data into at least one of the one or more domains based on at least one or more enterprise data capabilities of each domain, wherein the enterprise data capabilities comprise at least data security, data access, reporting and analytics, and data management and control.

In some embodiments, the instruction code of said module for causing the at least one processor to: categorize the data received from the one or more systems of record in real-time.

In some embodiments, the instruction code of said module for causing the at least one processor to: categorize the data received from the one or more systems of record in a batch process.

In some embodiments, said module further comprises instruction code for causing said at least one processor to: monitor the authorized data sources in real-time to identify data redundancies by comparing the data categorized into one or more domains with the subsequently received data from the one or more systems of record to determine a match.

In some embodiments, said module further comprises instruction code for causing said at least one processor to: determine a domain category associated with the data; and categorizing the authorized data source based on at least the domain category associated with the data.

In another aspect, a computer implemented method for mapping data into one or more domains and authorized data sources is presented. The method comprising receiving, using a computing device processor, data from one or more systems of record, wherein the data comprises one or more fields; determining, using a computing device processor, one or more domains associated with the data, wherein the one or more domains comprise at least a transaction domain, a reference and master data domain, a derived domain, and a discovery domain; determining, using a computing device processor, one or more data types associated with each of the one or more domains; categorizing, using a computing device processor, the data into at least one of the one or more domains and the one or more data types, wherein categorizing the data further comprises reconciling the data and removing data redundancies; and store the categorized data as an authorized data source capable of being accessed by one or more target systems.

In yet another aspect, a computer program product for mapping data into one or more domains and authorized data sources is presented. The computer program product comprising a non-transitory computer-readable medium comprising code causing a first apparatus to: receive data from one or more systems of record, wherein the data comprises one or more fields; determine one or more domains associated with the data, wherein the one or more domains comprise at least a transaction domain, a reference and master data domain, a derived domain, and a discovery domain; determine one or more data types associated with each of the one or more domains; categorize the data into at least one of the one or more domains and the one or more data types, wherein categorizing the data further comprises reconciling the data and removing data redundancies; and store the categorized data as an authorized data source capable of being accessed by one or more target systems.

BRIEF DESCRIPTION OF THE DRAWINGS

Figure 1:
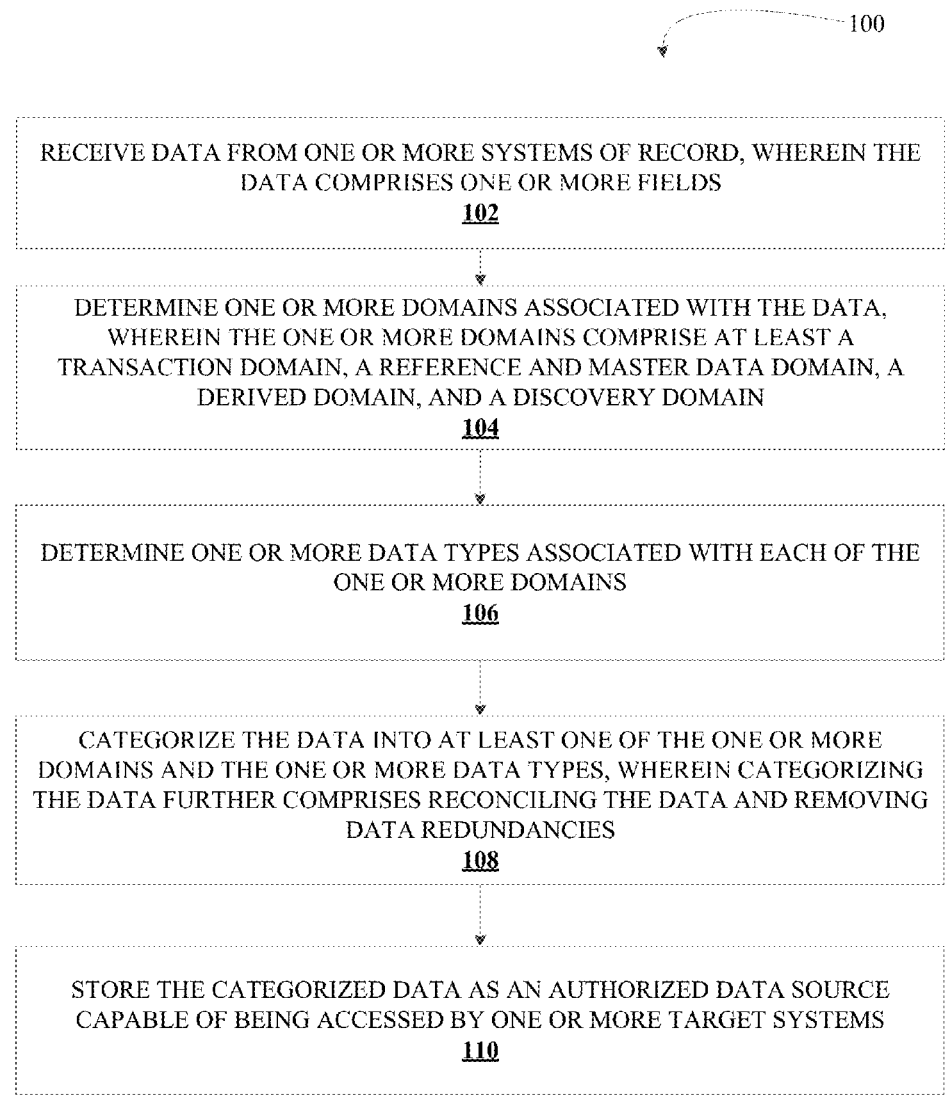

Having thus described embodiments of the invention in general terms, reference will be made to the accompanying drawings, where:

FIG. 1 presents a high level process flow for mapping data into one or more authorized data sources in accordance with an embodiment of an invention.

Figure 2A:
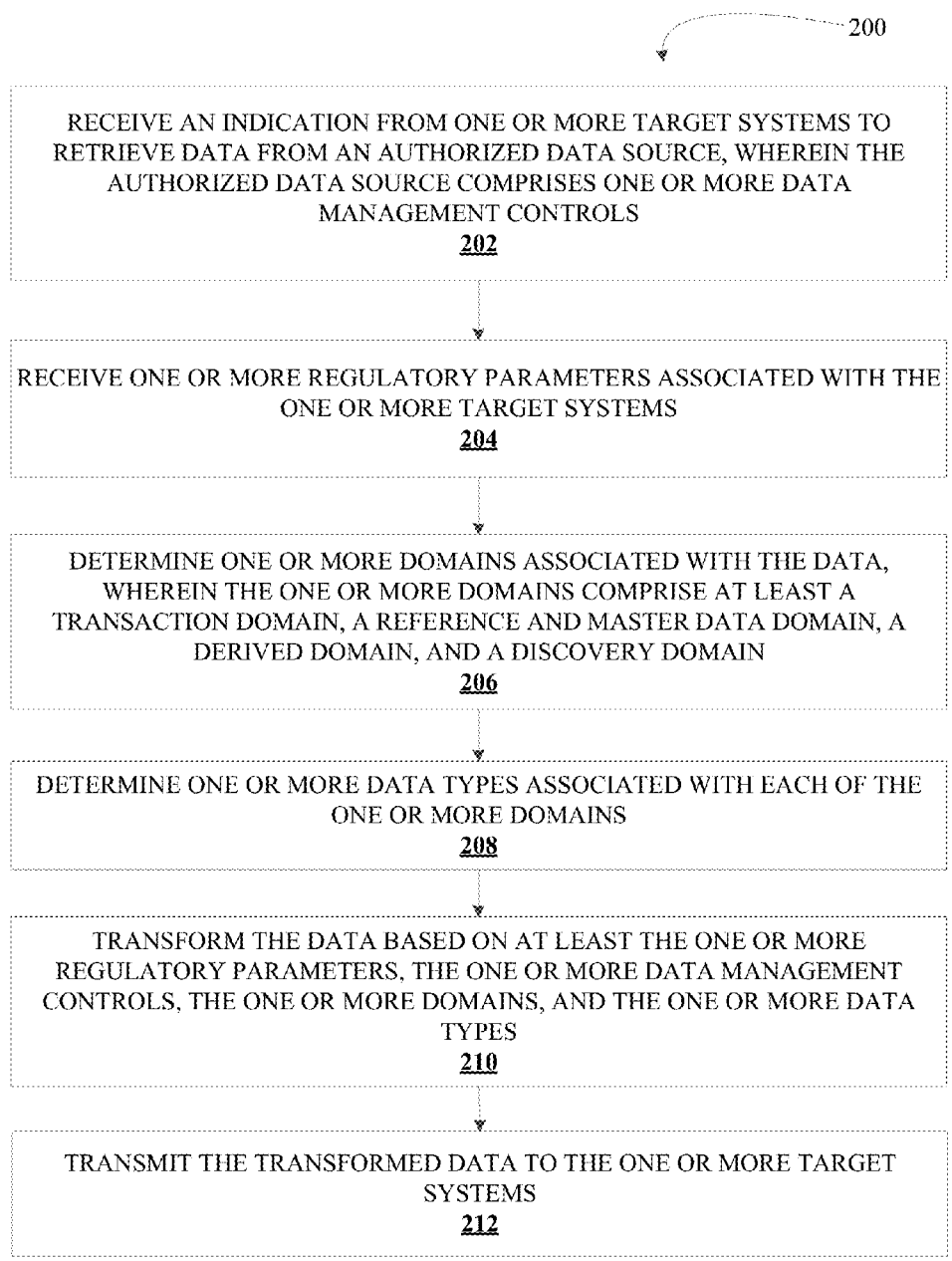

FIG. 2A illustrates a high level process flow for presenting authorized data to target systems in accordance with an embodiment of an invention.

Figure 2B:
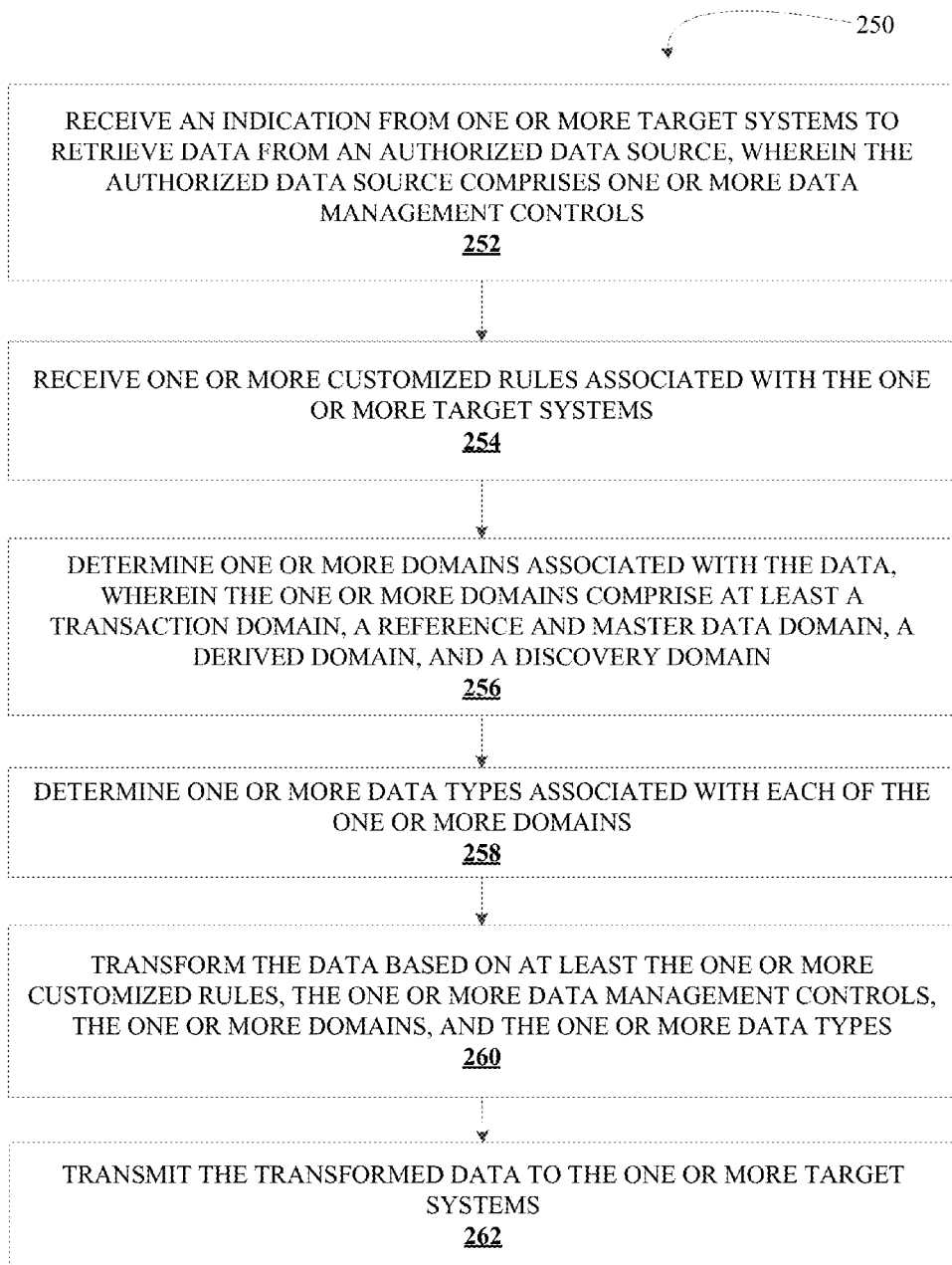

FIG. 2B illustrates a high level process flow for presenting authorized data to target systems in accordance with an embodiment of an invention.

Figure 3:
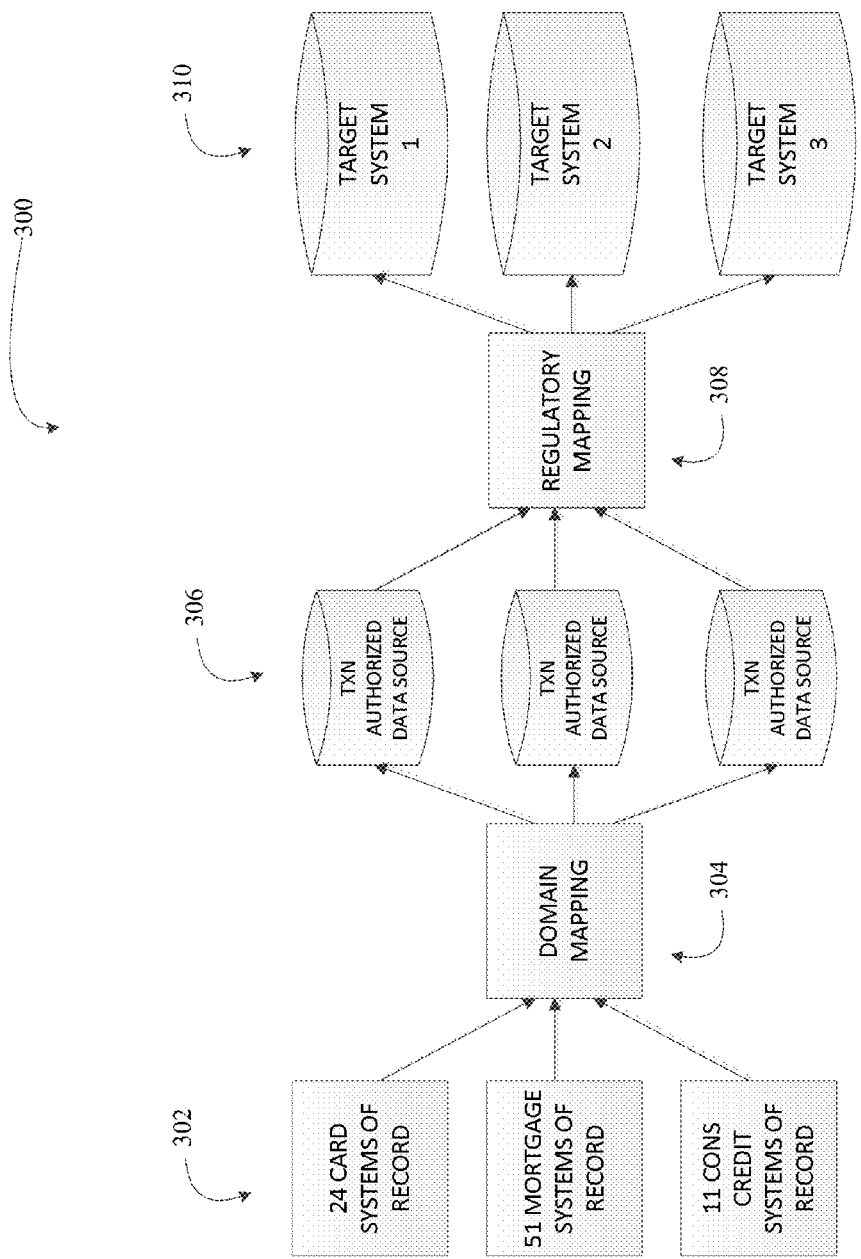

FIG. 3 illustrates and exemplary process diagram for mapping data from one or more systems of record to one or more target systems.

Figure 4:
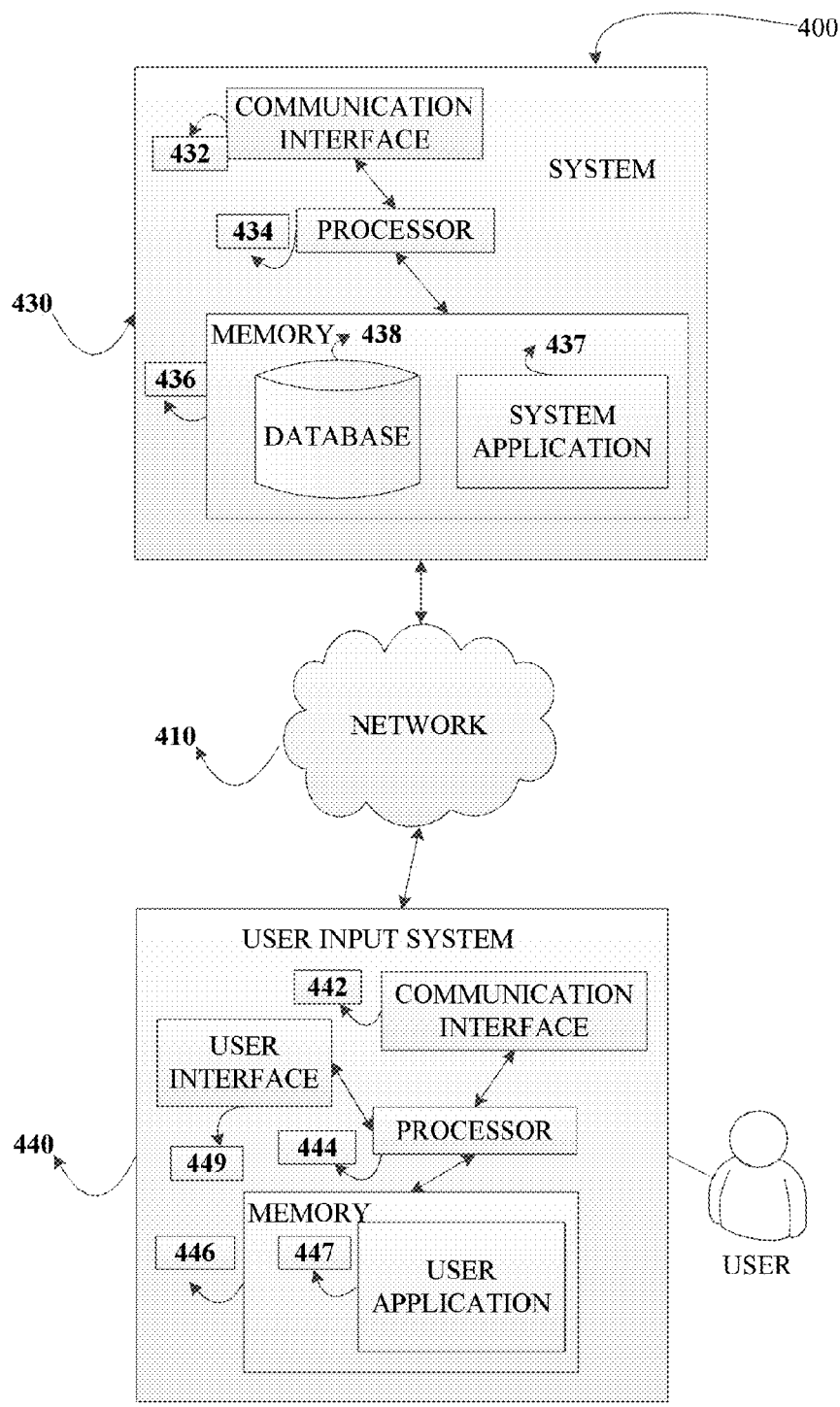

FIG. 4 presents an exemplary block diagram of the system environment in accordance with embodiments of the invention.

Figure 5:
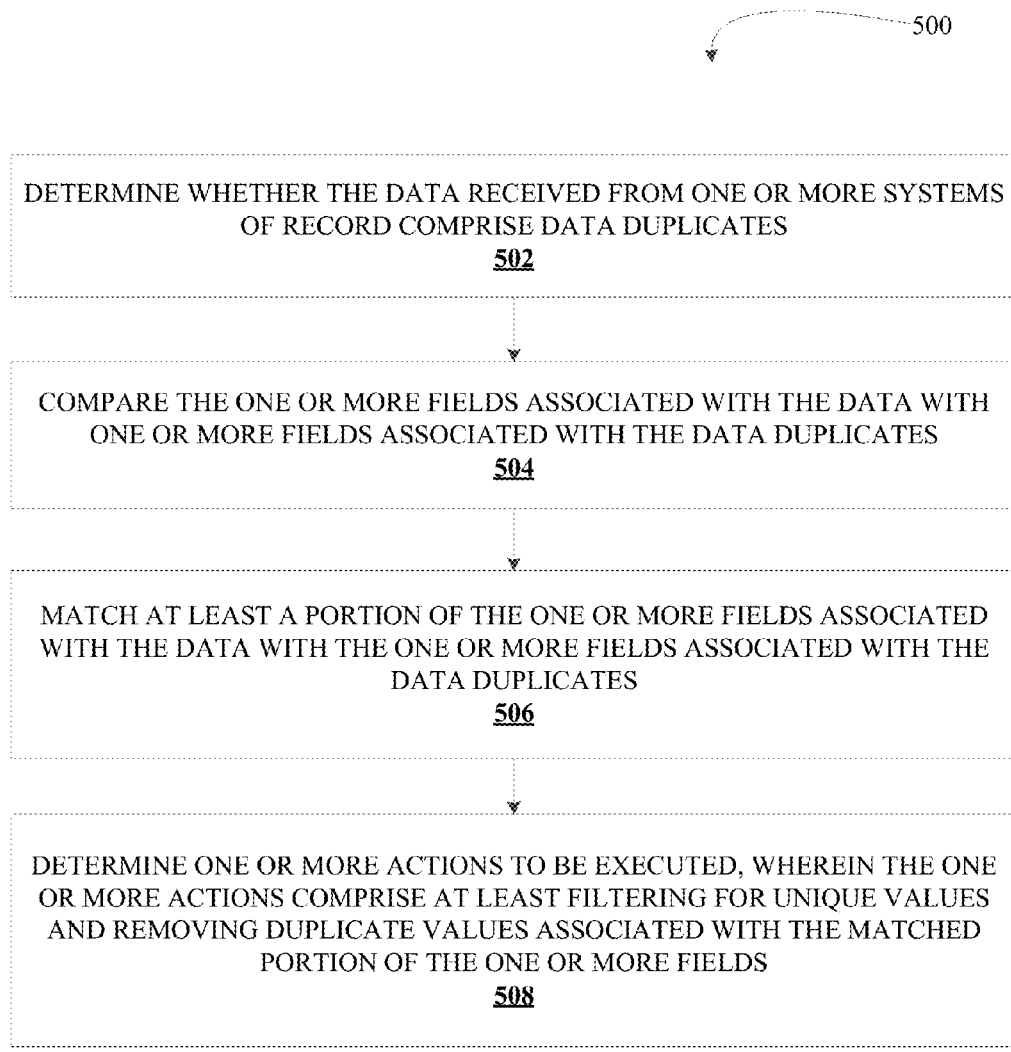

FIG. 5 illustrates a high level process flow for identifying data duplicates according to an embodiment of the invention.

Figure 6:
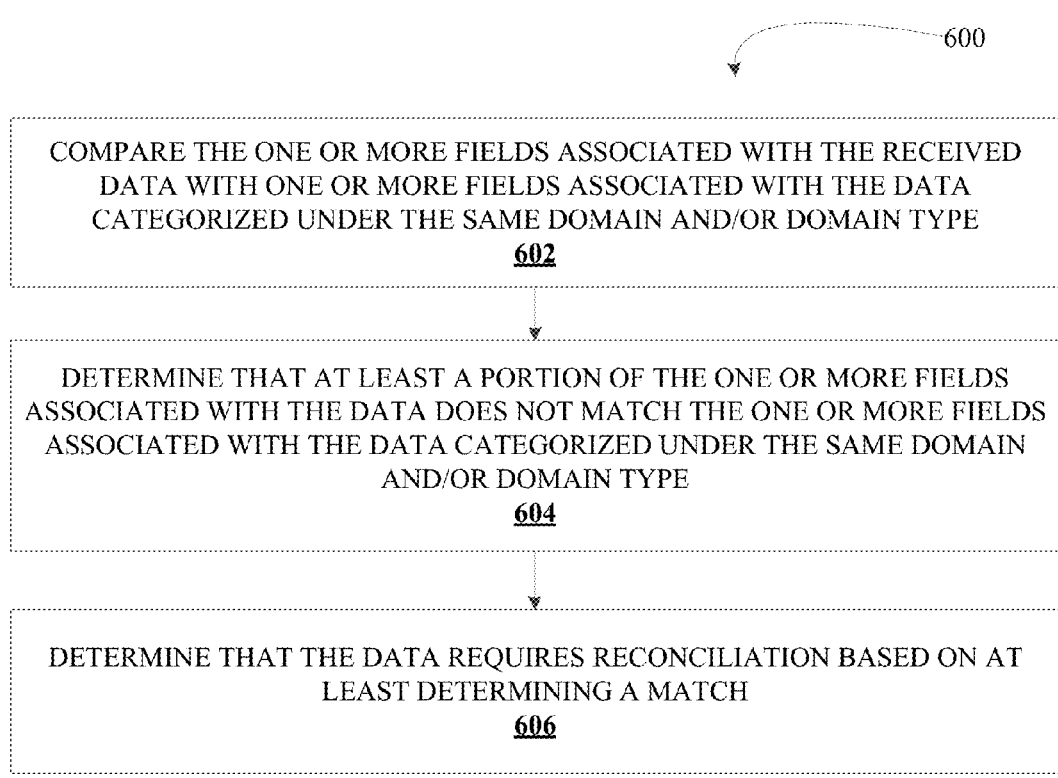

FIG. 6 illustrates a high level process flow for determining evidence of incomplete data according to an embodiment of the invention.

FIG. 7 illustrates an exemplary embodiment of the data domain categories in accordance with an embodiment of the invention.

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Enterprise data management (EDM) is the exercise of guidance over the management of data assets and the performance of data functions. Typically, data governance refers to the overall management of the availability, usability, integrity, and security of the data employed in an organization. In essence, the present invention defines a framework to establish personnel, policies, procedures, and organizational structures in place to make data accurate, consistent, and complete. Furthermore, the present invention addresses the transmission of different datasets within processes and applications that rely on the consumption of these data sets to complete business processes or transactions. The primary objective of EDM is to remove organizational issues and conflicts resulting from the mismanagement of information and data, by implementing a structured data delivery strategy.

The present invention provides the functional benefit of defining data provisioning sources, capabilities and standards as enterprise owned, and to be designed to address enterprise needs. This is done by establishing the enterprise needs as the highest priority and focusing on emerging exposure data aggregation requirements. It is imperative that the data provisioning sources are sanctioned by the enterprise using one or more fact based criteria such as cost, content, quality, latency, security, or the like. In this regard, the present invention may design an open architecture to enable integration of data from one or more platforms and maximize flexibility to meet future needs.

In one aspect, the present invention may define one or more service level agreements and prioritization process for managing one or more authorized data sources. In one aspect, embodiments of the present invention may establish data protection requirements and accountability at the one or more authorized data sources and eliminate data access and provisioning from non-official/unauthorized data repositories. In this regard, the present invention may require data users to leverage authorized data sources and eliminate unsanctioned data repositories to reduce data storage volume and cost. In one aspect, the present invention may control and minimize data retention to mitigate exposure. In this regard, the present invention may simplify the architecture by limiting the number of assets and establishing a common enterprise data taxonomy to integrate data across the enterprise.

Typically, data can be related to all facets of the business, such as customer transactions, customer demographics, company financial information, operational processes, inventory management, industry trends, supplier transactions, and competitor profiles. Data is typically collected from internal sources, such as transaction systems, manufacturing processes, customer records, as well as external sources such as market data, the printed media, and the Internet.

In some embodiments, a "user" may be a financial institution employee (e.g., an underwriter, a project manager, an IT specialist, a manager, an administrator, an internal operations analyst, bank teller or the like) capable of operating the system described herein. In some other embodiments, a customer may be an employee in any business environment. For purposes of this invention, the term "user" and "customer" may be used interchangeably. In some embodiments, a "user" may be a financial institution customer (e.g., an account holder or a person who have an account (e.g., banking account, credit account, or the like)). In one aspect, a customer may be any individual who enters a financial institution environment. In some embodiments, the customer may be an individual who may be interested in opening an account with the financial institution. In some other embodiments, a customer may be any individual who enters a business environment.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g. a banking account), a savings account, an investment account, a money market account, a time deposit, a demand deposit, a pre-paid account, a credit account, a non-monetary customer profile that includes only personal information associated with the customer, or the like. The account is associated with and/or maintained by an entity. In other embodiments, an "entity" may not be a financial institution.

FIG. 1 illustrates a high level process flow 100 for mapping data into one or more authorized data sources. As shown in block 102, the process flow includes receiving data from one or more systems of record, wherein the data comprises one or more fields. Typically, a data field is a data storage location commonly used to refer to a column in a database or a field in a data entry or web form. The field may contain data to be entered as well as data to be displayed. In some embodiments, a "system of record" may include an information storage and retrieval system for a given data element or piece of information. Typically, systems or record may be identified and categorized into one or more system types. The need to identify systems of record can become acute in organizations where management information systems have been built by taking output data from multiple source systems, re-processing the data, and then representing the result for a new business use. In some embodiments, the same piece of information may be represented in one or more forms based on disagreements stemming from semantic differences, differences in opinion, use of different sources, differences in the timing of extract-transform-load (ETL) that create the data reported against, bugs in the system, or the like. In some embodiments, the integrity and validity of any data set may be questionable when there is no traceable connection to a reliable source.

As shown in block 104, the process flow includes determining one or more domains associated with the data, wherein the one or more domains comprise at least a transaction domain, a reference and master domain, a derived domain, and a discovery domain. Typically, the data domains are used to categorize data types and data structures within an entity. In some embodiments, transaction data may refer to business transactions that are captured during business operations and processes, such as purchase records, inquiries, and payments. Master data may refer to enterprise-level data that are of a strategic value to an organization. They are typically non-volatile and non-transactional in nature. Customer, product supplier, and location/site are some common master data. Reference data may refer to internally managed or externally sourced facts to support an entity's ability to effectively process transactions, manage master data, and provide decision support capabilities. Geo data and market data are among the most commonly used reference data. Discovery analytics data may refer to features associated with the discovery and communication of meaningful patterns in data. Most valuable in areas concerning recorded information, discovery analytics relies on the simultaneous application of statistics, computer programming, and operations research to quantify performance. Consumer behavior, spending patterns, and profile data are some common discovery analytics data. Derived data may refer to intrinsic data associated with the entity or data derived from one or more other data domains. These one or more data domains are a single, reliable, and official source of data and information for one or more target systems.

Embodiments of the invention may establish governance roles and responsibilities to manage enterprise data. In this regard, the governance roles may be aligned by at least data domain and line of business. In some embodiments, one or more users may be provided with the responsibility to manage one or more aspects of enterprise data. Typically, some of the key responsibilities associated with the management of the enterprise data aligned by data domain include demand management of the authorized data source, informational and technical design of the authorized data source, and provisioning business as usual operations and defects management. In one aspect, a user may be a transaction/reference authorized data source owner. In this regard, the user may be responsible in a cross-line of business perspective for the management of the authorized data source repository that contains transaction data and data quality monitoring and remediation associated with the transaction authorized data source. In another aspect, a user may be a derived authorized data source owner. In this regard, the user may be responsible for the end-to-end technical management of a repository that contains reporting use case derived data and defining requirements to the transaction and reference authorized data sources. In yet another aspect, the user may be a data domain manager. In this regard, the user may be responsible for representing business capabilities for data provisioning in a particular data domain, development of data taxonomy for a domain, and management of a plan to converge to a reliable authorized data source and retire other systems. Typically, some of the key responsibilities associated with the management of the enterprise data aligned by line of business include approval of business and development of data management strategy. In one aspect, the user may be a data management executive. In this regard, the user may be responsible for representing the data consumers and management of funding needs. In another aspect, the user may be a data steward executive. In this regard, the user may be responsible for reporting to the data management executive and execution of the data management implementation plan. In some embodiments, the system may be configured to determine one or more users associated with each authorized data domain from a point of view of the business and the technology.

In some embodiments, the data received from one or more systems of record may be categorized based on one or more enterprise data capabilities of each domain, wherein the enterprise data capabilities comprise at least data security, data access, reporting and analytics, and data management and control. In one aspect, data security may include policies and tools to manage entity-wide identity and access model and secure sharing of data. In another aspect, data access may include standard data provisioning and consumption services to find and share data. In yet another aspect, reporting and analytics may include a standardized toolset for analytics and reporting (e.g., business intelligence tools). In yet another aspect, data management and control may include tools and policies to measure and monitor data quality and service level agreements.

As shown in block 106, the process flow includes determining one or more data types associated with each of the one or more domains. Typically, a data type is a classification identifying one of various types of data for defining and implementing them. In one aspect, a data type may be associated with each of the one or more domains. For example, a transaction authorized data source may include one or more data types such as brokerage and trust, mortgage, consumer credit, cards, deposits, or the like. In another example, a reference and master authorized data source may include one or more data types such as customer/client account relationship, product, chart of accounts, or the like. In yet another example, a derived data authorized data source may include one or more data types such as general ledger data, customer profitability data, liquidity data, capital data, or the like.

In some embodiments, each data source is considered as an authorized data source based on one or more criteria such as feasibility, completeness, depth, usage, frequency, quality, documentation, and business ownership. In one aspect, the system may be configured to determine whether the authorized data source contains a total enterprise view of the records for one or more data types. In another aspect, the system may be configured to determine whether the authorized data source is capable of supplying periodic data to critical enterprise functions such as capital, treasury, core finance, or the like. In yet another aspect, the system may be configured to determine a frequency associated with the authorize data source. In yet another aspect, the system may be configured to determine whether the authorized data source is capable supporting a specific enterprise purpose or participate in the standardization of the data. In some embodiments, the system may be configured to determine whether the authorized data source includes processes in place to document metadata associated with each piece of information received from one or more systems of record and a depth of coverage associated with the metadata. Typically, metadata refers to "data about the data", or description of data. Examples of metadata include data name, data dimensions or units, definition of a data entity, or a calculation formula of metrics.

As shown in block 108, the process flow includes categorizing the data into at least one of the one or more domains and the one or more data types, wherein categorizing the data further comprises reconciling the data and remove data redundancies. In some embodiments, the data received from the one or more systems of record may be normalized, whereby the data is reduced to a set of relations while ensuring data integrity and eliminating data redundancy. In this regard, the system may be configured to determine whether all of the data received from the one or more systems of record are consistent, and satisfy all the integrity constraints before being stored as an authorized data source. In one aspect, at least a portion of data received from a particular system of record may be found in one or more other systems or authorized data sources, thereby creating a direct redundancy. In another aspect, at least a portion of the data received from a particular system of record may be calculated or derived from at least a portion of data received from the one or more other systems of record or authorized data sources, thereby creating an indirect redundancy. The system may be configured to identify and remove such redundancies without compromising the one or more integrity rules. Addressing data redundancy helps prevent data insertion and deletion, since the data is only available in a single reliable authorized data source.

In some embodiments, the data received from the one or more systems of record may require data reconciliation. In this regard, the system may be configured to identify inconsistent or non-coherent data, non-integrating data, unclean/non-profiled data, logical issues/inherent flaws, or the like from the one or more systems of record and reconcile the data accordingly.

As shown in block 110, in response to categorizing the data, the process flow includes storing the categorized data as an authorized data source capable of being accessed by one or more target systems. Typically, a "target system" may be any system configured to receive the data and may include one or more specifically purposed hardware elements and corresponding software that enables the target system to receive, store, process, and/or transmit the data. For purposes of the invention, the target system may be an outboard and/or third party data processing system associated with one or more businesses associated with the entity. In one aspect, the businesses associated with the entity may be internal such as wholesale credit exposure analysis unit, mortgage/loan interest analysis unit, or the like. In another aspect, the businesses associated with the entity may be external such as a third party payment processor.

In some embodiments, the system may be configured to determine a domain category associated with the data received from the one or more systems of record. For example, the system may receive client information from one or more systems of record and be mapped to an authorized data source. The corresponding authorized data source may be categorized as an authorized data source for "core customer/clients". In another example, the system may receive employee information from one or more systems of record (e.g. Human resources, contractual agreements, etc.) and be mapped to an authorized data source. The corresponding authorized data source may be categorized as an authorized data source for "employees". In this way, the system may be configured to categorize the authorized data source based on at least the domain category associated with the data.

FIG. 2A illustrates a high level process flow for presenting authorized data to target systems 200. As shown in block 202, the process flow includes receiving an indication from one or more target systems to retrieve data from an authorized data source, wherein the authorized data source comprises one or more data management controls. Typically, data management controls exist to ensure limited access to avoid unauthorized revisions and to provide a record of any changes to the data. In this regard, a target system may require adequate authorization to access the authorized data source and retrieve data.

As shown in block 204, the process flow includes receiving one or more regulatory parameters associated with the one or more target systems. Typically, the one or more regulatory parameters are used to retrieve data from an authorized data source when the information being retrieved is too complex to be handled by quick filters or action filters. In some embodiments, the regulatory parameters may include one or more parameters, characteristics, features, or measurement factors considered in the evaluation of data.

As shown in block 206, the process flow includes determining one or more domains associated with the data, wherein the one or more domains comprise at least a transaction domain, a reference and master data domain, a derived domain, and a discovery domain. Also, the process flow includes determining one or more data types associated with each of the one or more domains, as shown in block 208.

In response, the process flow may include transforming the data based on at least the one or more regulatory parameters, the one or more data management controls, the one or more domains, and the one or more data types, as shown in block 210. For example, in a financial institution environment, for purposes of Liquidity (target system), a customer may be classified as a small business if the customer has a deposit amount greater than a predetermined deposit amount every month. In this regard, when the Liquidity target system requests data from an authorized data source based on one or more regulatory parameters to reflect the customer as a small business. In another example, for purposes of Capital (target system), the customer may not be classified as a small business unless they have a small business loan with the financial institution. In this regard, the one or more regulatory parameters may include one or more conditions associated with the target system for categorizing the customer.

In response, the process flow includes transmitting the transformed data to the one or more target systems, as shown in block 212. In some embodiments, the data may be transformed dynamically, in that, the system may be configured to transform the data stored in the authorized data source based on at least the one or more regulatory parameters in response to receiving the indication from the one or more target systems to retrieve data and then transmit the transformed data. In some other embodiments, the system may be configured to transform and store the data in the authorized data source prior to receiving the indication from the target system and transmit the data to the target system in response to receiving the indication from the one or more target systems to retrieve data. In this regard, the system may be configured to create subscriptions for one or more target systems based on the one or more regulatory parameters previously stored in a database associated with the system. In one aspect, the subscription may be a specific terms and conditions previously agreed upon by the target system and the authorized data source for transformation and transmission of the data. In one aspect, in addition to one or more regulatory parameters, the subscriptions may be periodic (e.g., daily, weekly, monthly, etc.). In this regard, the system may be configured to transform the data and transmit the transformed data to one or more target systems periodically. In one aspect, the system may be configured to transmit the transformed data to one or more target systems automatically without receiving any indication from the target system.

FIG. 2B illustrates a high level process flow for presenting authorized data to target systems 250. As shown in block 252, the process flow includes receiving an indication from one or more target systems to retrieve data from an authorized data source, wherein the authorized data source comprises one or more data management controls. Also, the process flow includes receiving one or more customized rules from the one or more target systems, as shown in block 254. In this regard, the system may be configured to receive one or more specific data requirements from one or more business units associated with the entity to identify and categorize business information effectively. In some embodiments, different business units may select different sets of customized rules based on their individual perspective of business processes, priorities, and/or alignment with industry standards. In one aspect, the system may be configured to apply security controls to the data such as encryption, authentication and logging. For example, the sales department in a business organization may require data to be categorized based on a geographic area of the customers for purposes of profiling. In some embodiments, the system may be configured to enable the one or more users associated with each business unit to define customized rules based on one or more criteria.

As shown in block 256, the process flow includes determining one or more domains associated with the data, wherein the one or more domains comprise at least a transaction domain, a reference and master data domain, a derived domain, and a discovery domain. Also, the process flow includes determining one or more data types associated with each of the one or more domains, as shown in block 258.

In response, the process flow may include transforming the data based on at least the one or more customized rules, the one or more data management controls, the one or more domains, and the one or more data types, as shown in block 260. In response to transforming the data, the process flow includes transmitting the transformed data to the one or more target systems, as shown in block 262.

FIG. 3 illustrates and exemplary process diagram for mapping data from one or more systems of record to one or more target systems 300. As shown in FIG. 3, the process diagram includes one or more systems of record 302 feeding into system configured for domain mapping 304. In some embodiments, the data received from one or more systems of record is categorized into one or more domains and one or more data types. In this regard, the data received from the one or more systems of record is reconciled to ensure data completeness and remove data redundancy. In one aspect, the data received from one or more systems of record is categorized in substantially real-time. In another aspect, the data received from the one or more systems of record is categorized as a batch. In this regard, the system may be configured to store the data in a database during a first time period and execute operations on the data at a second time period. In one aspect, the first time period is different from the second time period. In response to mapping the data into one or more domains, the system may be configured to store the data into one or more authorized data sources 306. As shown in FIG. 3, the system may then be configured to receive an indication from one or more target systems to access the one or more authorized data sources. In response, the system may transmit the data from the one or more authorized data sources to be configured for regulatory mapping. In some embodiments, the data from the one or more authorized data sources may be mapped according to one or more regulatory parameters associated with the one or more target systems. In this regard, the data from the one or more authorized data sources are transformed based on one or more regulatory parameters, one or more data management, one or more domains, and one or more data types and transmitted to the one or more target systems 310.

FIG. 4 presents an exemplary block diagram of the system environment 400 for implementing the process flows described herein in accordance with embodiments of the invention. As illustrated, the system environment 400 includes a network 410, a system 430, and a user input system 440. Also shown in FIG. 4 is a user of the user input system 440. The user input system 440 may be a mobile device or other non-mobile computing device. The user may be a person who uses the user input system 440 to execute a user application 447. The user application 447 may be an application to communicate with the system 430, perform a transaction, input information onto a user interface presented on the user input system 440, or the like. The user application 447 and/or the system application 437 may incorporate one or more parts of any process flow described herein.

As shown in FIG. 4, the system 430, and the user input system 340 are each operatively and selectively connected to the network 410, which may include one or more separate networks. In addition, the network 410 may include a telecommunication network, local area network (LAN), a wide area network (WAN), and/or a global area network (GAN), such as the Internet. It will also be understood that the network 410 may be secure and/or unsecure and may also include wireless and/or wired and/or optical interconnection technology.

The user input system 440 may include any computerized apparatus that can be configured to perform any one or more of the functions of the user input system 440 described and/or contemplated herein. For example, the user may use the user input system 440 to transmit and/or receive information or commands to and from the system 430. In some embodiments, for example, the user input system 440 may include a personal computer system (e.g. a non-mobile or non-portable computing system, or the like), a mobile computing device, a personal digital assistant, a mobile phone, a tablet computing device, a network device, and/or the like. As illustrated in FIG. 4, in accordance with some embodiments of the present invention, the user input system 440 includes a communication interface 442, a processor 444, a memory 446 having an user application 447 stored therein, and a user interface 449. In such embodiments, the communication interface 442 is operatively and selectively connected to the processor 444, which is operatively and selectively connected to the user interface 449 and the memory 446. In some embodiments, the user may use the user application 447 to execute processes described with respect to the process flows described herein. Specifically, the user application 447 executes the process flows described herein.

Each communication interface described herein, including the communication interface 442, generally includes hardware, and, in some instances, software, that enables the user input system 440, to transport, send, receive, and/or otherwise communicate information to and/or from the communication interface of one or more other systems on the network 410. For example, the communication interface 442 of the user input system 440 may include a wireless transceiver, modem, server, electrical connection, and/or other electronic device that operatively connects the user input system 440 to another system such as the system 430. The wireless transceiver may include a radio circuit to enable wireless transmission and reception of information. Additionally, the user input system 440 may include a positioning system. The positioning system (e.g. a global positioning system (GPS), a network address (IP address) positioning system, a positioning system based on the nearest cell tower location, or the like) may enable at least the user input system 440 or an external server or computing device in communication with the user input system 440 to determine the location (e.g. location coordinates) of the user input system 440.

Each processor described herein, including the processor 344, generally includes circuitry for implementing the audio, visual, and/or logic functions of the user input system 340. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 447 of the memory 446 of the user input system 340.

Each memory device described herein, including the memory 446 for storing the user application 447 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 4, the memory 446 includes the user application 447. In some embodiments, the user application 447 includes an interface for communicating with, navigating, controlling, configuring, and/or using the user input system 440. In some embodiments, the user application 447 includes computer-executable program code portions for instructing the processor 444 to perform one or more of the functions of the user application 447 described and/or contemplated herein. In some embodiments, the user application 447 may include and/or use one or more network and/or system communication protocols.

Also shown in FIG. 4 is the user interface 449. In some embodiments, the user interface 349 includes one or more output devices, such as a display and/or speaker, for presenting information to the user. In some embodiments, the user interface 349 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 449 includes the input and display devices of a mobile device, which are operable to receive and display information.

FIG. 4 also illustrates a system 430, in accordance with an embodiment of the present invention. The system 430 may refer to the "apparatus" described herein. The system 430 may include any computerized apparatus that can be configured to perform any one or more of the functions of the system 430 described and/or contemplated herein. In accordance with some embodiments, for example, the system 430 may include a computer network, an engine, a platform, a server, a database system, a front end system, a back end system, a personal computer system, and/or the like. Therefore, the system 430 may be a server managed by the business. The system 430 may be located at the facility associated with the business or remotely from the facility associated with the business. In some embodiments, such as the one illustrated in FIG. 4, the system 430 includes a communication interface 432, a processor 434, and a memory 436, which includes a system application 437 and a structured database 438 stored therein. As shown, the communication interface 432 is operatively and selectively connected to the processor 334, which is operatively and selectively connected to the memory 436.

It will be understood that the system application 437 may be configured to implement any one or more portions of the various user interfaces and/or process flow described herein.

The system application 437 may interact with the user application 447. It will also be understood that, in some embodiments, the memory includes other applications. It will also be understood that, in some embodiments, the system application 437 is configured to communicate with the structured database 438, the user input system 440, or the like.

It will be further understood that, in some embodiments, the system application 437 includes computer-executable program code portions for instructing the processor 434 to perform any one or more of the functions of the system application 437 described and/or contemplated herein. In some embodiments, the system application 437 may include and/or use one or more network and/or system communication protocols.

In addition to the system application 437, the memory 436 also includes the structured database 438. As used herein, the structured database 438 may be one or more distinct and/or remote databases. In some embodiments, the structured database 438 is not located within the system and is instead located remotely from the system. In some embodiments, the structured database 438 stores information or data described herein.

It will be understood that the structured database 438 may include any one or more storage devices, including, but not limited to, datastores, databases, and/or any of the other storage devices typically associated with a computer system. It will also be understood that the structured database 438 may store information in any known way, such as, for example, by using one or more computer codes and/or languages, alphanumeric character strings, data sets, figures, tables, charts, links, documents, and/or the like. Further, in some embodiments, the structured database 438 may include information associated with one or more applications, such as, for example, the system application 437. It will also be understood that, in some embodiments, the structured database 438 provides a substantially real-time representation of the information stored therein, so that, for example, when the processor 434 accesses the structured database 438, the information stored therein is current or substantially current.

It will be understood that the embodiment of the system environment illustrated in FIG. 4 is exemplary and that other embodiments may vary. As another example, in some embodiments, the system 430 includes more, less, or different components. As another example, in some embodiments, some or all of the portions of the system environment 400 may be combined into a single portion. Likewise, in some embodiments, some or all of the portions of the system 330 may be separated into two or more distinct portions.

In addition, the various portions of the system environment 400 may be maintained for and/or by the same or separate parties. It will also be understood that the system 430 may include and/or implement any embodiment of the present invention described and/or contemplated herein. For example, in some embodiments, the system 430 is configured to implement any one or more of the embodiments of the process flows described and/or contemplated herein in connection any process flow described herein. Additionally, the system 430 or the user input system 440 is configured to initiate presentation of any of the user interfaces described herein.

FIG. 5 illustrates a high level process flow for identifying data duplicates according to an embodiment of the invention 500. As shown in block 502, the process flow includes determining whether the data received from one or more systems of record comprise data duplicates. In some embodiments, the data duplicates may arise from data received from the one or more systems of record. In response, the process flow includes comparing the one or more fields associated with the data with the one or more fields associated with the data duplicates, as shown in block 504. In response to comparing, the process flow then includes matching at least a portion of the one or more fields associated with the data with the one or more fields associated with the data duplicates, as shown in block 506. In response to matching, the process flow includes determining one or more actions to be executed, wherein the one or more actions comprise at least filtering for unique values and removing duplicate values associated with the matched portion of the one or more fields, as shown in block 508.

FIG. 6 illustrates a high level process flow for determining evidence of incomplete data according to an embodiment of the invention 600. As shown in block 602, the process flow includes comparing the one or more fields associated with the received data with the one or more fields associated with the data categorized under the same domain and/or domain type. In response, the process flow includes determining that at least a portion of the one or more fields associated with the data does not match the one or more fields associated with the data categorized under the same domain and/or domain type. In response to determining that at least a portion of the one or more fields associated with the data does not match the one or more fields associated with the data categorized under the same domain and/or domain type, the process flow includes determining that the data requires reconciliation, as shown in block 606. In one aspect, determining that the data fields do not match further comprises determining that the data is at least incomplete, inaccurate, or inconsistent. In this regard, the system may be configured to initiate a reconciliation process with one or more systems of record associated with the data. In some embodiments, the reconciliation process may include determining whether the one or more data fields associated with the data received by the authorized data source is consistent with the data received by the system from the one or more systems of record for mapping. In this regard, the system may determine that the one or more data fields associated with the data received from the one or more systems of record matches the one or more data fields associated with the data transmitted to the one or more target systems. In one aspect, the system may be configured to determine whether the data requiring reconciliation are material or trivial to the process.

In response, the system may be configured to determine whether at least a portion of the data has been dropped during the mapping of the data received from the one or more systems of record to an authorized data source. In this regard, the system may be configured to enable the one or more users to analyze the code to determine the source of the inconsistency.

FIG. 7 illustrates an exemplary embodiment of the data domain categories in accordance with an embodiment of the invention 700. As shown in FIG. 7, the exemplary embodiment includes one or more domains 702, one or more data types 704 associated with each of the one or more domains 702, one or more authorized data sources 706 associated with the one or more domains 702, one or more technical contacts 708 associated with the one or more domains 702, and one or more business contacts 710 associated with the one or more domains 702.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for mapping data into an authorized data source, the system comprising:
   at least non-transitory storage device;
   at least one processor; and
   at least one module stored in said storage device and comprising instruction code that is executable by the at least one processor and configured to cause said at least one processor to:
   receive data from one or more systems of record, wherein the data comprises one or more fields;
   determine one or more domains associated with the data, wherein the one or more domains comprise at least a transaction domain, a reference and master data domain, a derived domain, and a discovery domain;
   determine one or more data types associated with each of the one or more domains;
   categorize, in real-time, the data into at least one of the one or more domains and the one or more data types, wherein categorizing the data further comprises reconciling the data and removing data redundancies, wherein the data is categorized into at least one of the one or more domains based on at least one or more enterprise data capabilities of each domain, wherein the enterprise data capabilities comprise at least data security, data access, reporting and analytics, and data management and control;
   compare the one or more fields associated with the data with one or more fields associated with the data categorized under the same domain and/or domain type;
   determine that at least a portion of the one or more fields associated with the data does not match the one or more fields associated with the data categorized under the same domain and/or domain type, wherein the failure to match between at least a portion of the one or more fields associated with the data and the one or more fields associated with the data is due to dropped packet instances;
   determine that the data requires reconciliation based on at least determining that at least a portion of the one or more fields associated with the data does not match the one or more fields associated with the data categorized under the same domain and/or domain type;
   reconcile the data such that the at least a portion of the one or more fields associated with the data matches the one or more fields associated with the data categorized under the same domain and/or domain type, wherein the reconciliation is based on at least determining that the data requires reconciliation;
   store the categorized data as an authorized data source capable of being accessed by one or more target systems.

2. The system of claim 1, wherein the instruction code of said module for causing the at least one processor to:
   determine whether the data received from one or more systems of record comprise data duplicates;
   compare the one or more fields associated with the data with one or more fields associated with the data duplicates;
   match at least a portion of the one or more fields associated with the data with the one or more fields associated with the data duplicates; and
   determine one or more actions to be executed, wherein the one or more actions comprise at least filtering for unique values and removing duplicate values associated with the matched portion of the one or more fields.

3. The system of claim 1, wherein the instruction code of said module for causing the at least one processor to:
   categorize the data received from the one or more systems of record in a batch process.

4. The system of claim 1, wherein said module further comprises instruction code for causing said at least one processor to:
   monitor the authorized data sources in real-time to identify data redundancies by comparing the data categorized into one or more domains with the subsequently received data from the one or more systems of record to determine a match.

5. The system of claim 1, wherein said module further comprises instruction code for causing said at least one processor to:
   determining a domain category associated with the data; and
   categorizing the authorized data source based on at least the domain category associated with the data.

6. A computer implemented method for mapping data into one or more domains and authorized data sources, the method comprising:
   receiving, using a computing device processor, data from one or more systems of record, wherein the data comprises one or more fields;
   determining, using a computing device processor, one or more domains associated with the data, wherein the one or more domains comprise at least a transaction domain, a reference and master data domain, a derived domain, and a discovery domain;
   determining, using a computing device processor, one or more data types associated with each of the one or more domains;
   categorizing in real-time, using a computing device processor, the data into at least one of the one or more domains and the one or more data types, wherein categorizing the data further comprises reconciling the data and removing data redundancies, wherein the data is categorized into at least one of the one or more domains based on at least one or more enterprise data capabilities of each domain, wherein the enterprise data capabilities comprise at least data security, data access, reporting and analytics, and data management and control;
   comparing, using a computing device processor, the one or more fields associated with the data with one or more fields associated with the data categorized under the same domain and/or domain type;
   determining, using a computing device processor, that at least a portion of the one or more fields associated with the data does not match the one or more fields associated with the data categorized under the same domain and/or domain type, wherein the mismatch between at least a portion of the one or more fields associated with the data and the one or more fields associated with the data is due to dropped packet instances;
   determining, using a computing device processor, that the data requires reconciliation based on at least determining that at least a portion of the one or more fields associated with the data does not match the one or more fields associated with the data categorized under the same domain and/or domain type;
   reconciling, using a computing device processor, the data such that the at least a portion of the one or more fields associated with the data matches the one or more fields associated with the data categorized under the same domain and/or domain type, wherein the reconciliation is based on at least determining that the data requires reconciliation; and storing, using a computing device processor, the categorized data as an authorized data source capable of being accessed by one or more target systems.

7. The method of claim 6 further comprises:

determining whether the data received from one or more systems of record comprise data duplicates;

comparing the one or more fields associated with the data with one or more fields associated with the data duplicates;

matching at least a portion of the one or more fields associated with the data with the one or more fields associated with the data duplicates; and determining one or more actions to be executed, wherein the one or more actions comprise at least filtering for unique values and removing duplicate values associated with the matched portion of the one or more fields.

8. The method of claim 6 further comprises:

categorizing the data received from the one or more systems of record in a batch process.

9. The method of claim 6 further comprises:

monitoring the authorized data sources in real-time to identify data redundancies by comparing the data categorized into one or more domains with the subsequently received data from the one or more systems of record to determine a match.

10. A computer program product for mapping data into one or more domains and authorized data sources, the computer program product comprising a non-transitory computer-readable medium comprising code causing a first apparatus to:

receive data from one or more systems of record, wherein the data comprises one or more fields;

determine one or more domains associated with the data, wherein the one or more domains comprise at least a transaction domain, a reference and master data domain, a derived domain, and a discovery domain;

determine one or more data types associated with each of the one or more domains;

categorize, in real-time, the data into at least one of the one or more domains and the one or more data types, wherein categorizing the data further comprises reconciling the data and removing data redundancies, wherein the data is categorized into at least one of the one or more domains based on at least one or more enterprise data capabilities of each domain, wherein the enterprise data capabilities comprise at least data security, data access, reporting and analytics, and data management and control;

compare the one or more fields associated with the data with one or more fields associated with the data categorized under the same domain and/or domain type;

determine that at least a portion of the one or more fields associated with the data does not match the one or more fields associated with the data categorized under the same domain and/or domain type, wherein the mismatch between at least a portion of the one or more fields associated with the data and the one or more fields associated with the data is due to dropped packet instances;

determine that the data requires reconciliation based on at least determining that at least a portion of the one or more fields associated with the data does not match the one or more fields associated with the data categorized under the same domain and/or domain type;

reconcile the data such that the at least a portion of the one or more fields associated with the data matches the one or more fields associated with the data categorized under the same domain and/or domain type, wherein the reconciliation is based on at least determining that the data requires reconciliation; and store the categorized data as an authorized data source capable of being accessed by one or more target systems.

11. The computer program product of claim 10, wherein the first apparatus is further configured to:

determine whether the data received from one or more systems of record comprise data duplicates;

compare the one or more fields associated with the data with one or more fields associated with the data duplicates;

match at least a portion of the one or more fields associated with the data with the one or more fields associated with the data duplicates; and determine one or more actions to be executed, wherein the one or more actions comprise at least filtering for unique values and removing duplicate values associated with the matched portion of the one or more fields.

12. The computer program product of claim 10, wherein the first apparatus is further configured to:

monitor the authorized data sources in real-time to identify data redundancies by comparing the data categorized into one or more domains with the subsequently received data from the one or more systems of record to determine a match.

* * * * *